United States Patent [19]

Stark

[11] Patent Number: 5,653,056
[45] Date of Patent: Aug. 5, 1997

[54] OPERATING APPARATUS FOR CONTROLLING THE OPERATION OF A REVOLVING DOOR

[75] Inventor: Jürgen Stark, Hattingen, Germany

[73] Assignee: DORMA GmbH & Co. KG, Ennepetal, Germany

[21] Appl. No.: 538,160

[22] Filed: Oct. 2, 1995

[30] Foreign Application Priority Data

Feb. 2, 1994 [DE] Germany .............. 44 02 899.7
Feb. 7, 1994 [DE] Germany .............. 44 03 565.9

[51] Int. Cl.⁶ .................................................. E05D 15/02
[52] U.S. Cl. .................................................. 49/43
[58] Field of Search ..................... 49/42, 43, 506, 49/32, 276

[56] References Cited

U.S. PATENT DOCUMENTS

| 3,497,997 | 3/1970 | Sheckells | 49/32 X |
|---|---|---|---|
| 4,339,843 | 7/1982 | Burnett | 49/32 X |
| 4,581,849 | 4/1986 | Schwarz | 49/32 |
| 5,097,454 | 3/1992 | Schwarz et al. | 49/42 X |

FOREIGN PATENT DOCUMENTS

| 0340771 | 11/1989 | Germany . |
|---|---|---|
| 3934662 | 4/1991 | Germany . |
| 4124282 | 1/1993 | Germany . |
| 4207705 | 4/1993 | Germany . |

Primary Examiner—Kenneth J. Dorner
Assistant Examiner—Jerry Redman
Attorney, Agent, or Firm—Nils H. Ljungman and Associates

[57] ABSTRACT

An apparatus for controlling the operation of a revolving door, in which an electric motor provides an assistance mode which supplies assistance so that the manual force applied by a person to a panel of the revolving door is reduced by a Δv, and thus the person using the door need only apply a slight additional force.

20 Claims, 10 Drawing Sheets

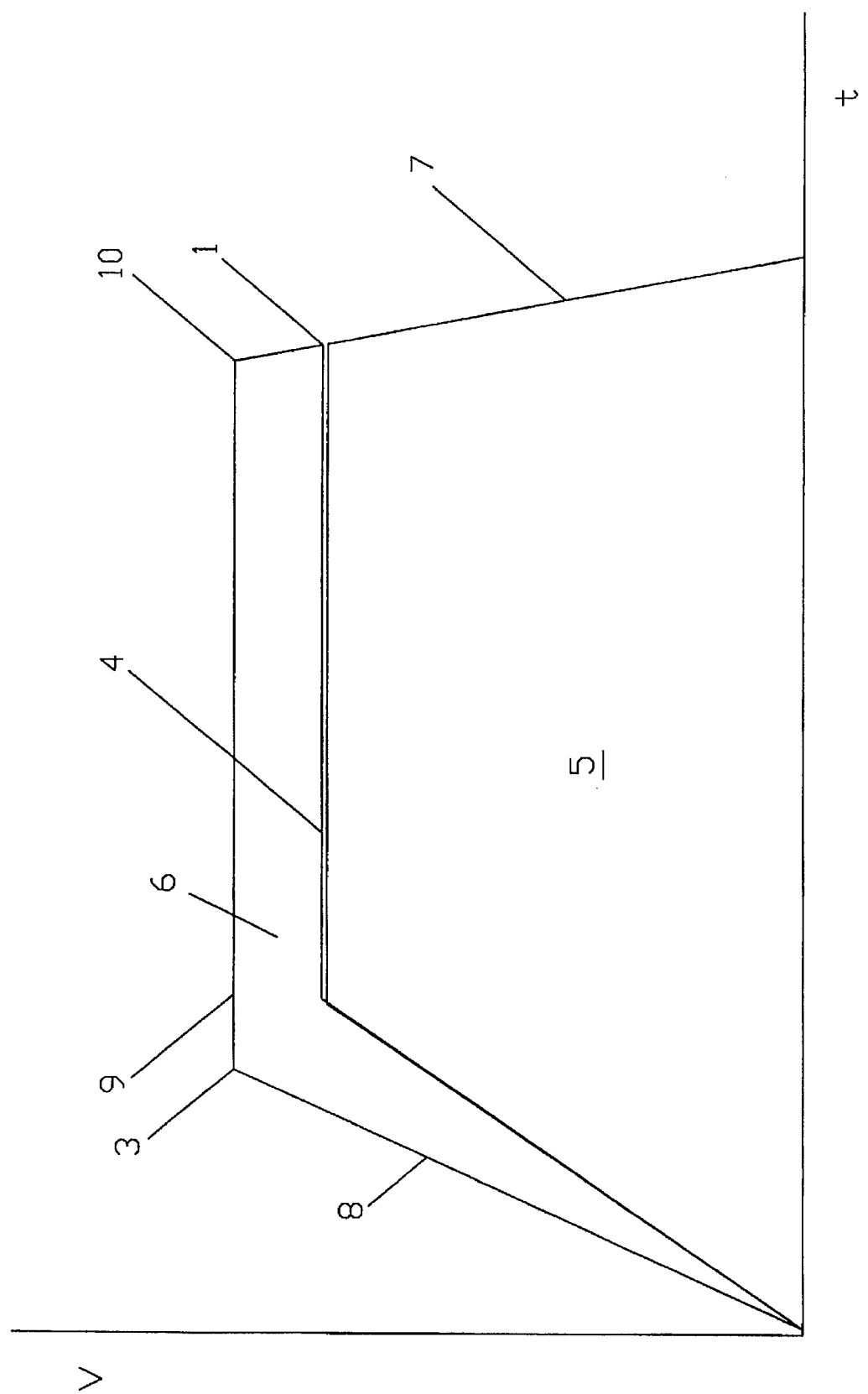

OPERATING APPARATUS FOR CONTROLLING THE OPERATION OF A REVOLVING DOOR

CONTINUING APPLICATION DATA

This application is a Continuation-In-Part Application of International Application No. PCT/DE94/01459, filed on Dec. 8, 1994, which claims priority from Federal Republic of Germany Application No. P 44 02 899.7, filed on Feb. 2, 1994. International Application No. PCT/DE94/01459, was pending as of the filing date of this application and designated the USA as a designated state.

This application is also a Continuation-In-Part Application of International Application No. PCT/DE94/01543, filed on Dec. 24, 1994, which claims priority from Federal Republic of Germany Application No. P 44 03 565.9, filed on Feb. 7, 1994. International Application No. PCT/DE94/01543, was pending as of the filing date of this application and designated the USA as a designated state.

CROSS-REFERENCE TO RELATED APPLICATION

The present application is directed to similar subject matter as that disclosed in U.S. patent application Ser. No. 08/538,156 entitled "Operating Method for the Operation of a Revolving Door" and filed on Oct. 2, 1995.

BACKGROUND OF THE INVENTION

1. Field of the Invention

The present invention relates to an operating method for the operation of a revolving door. the revolving panels of which are driven by an electric motor, and which is controlled and regulated in terms of its propulsion and revolution by a microprocessor open-loop or closed-loop control system, respectively, but in which the electric motor does not apply the entire propulsion force, but only a portion of it, and the person who is passing through the revolving door must exert a force on the door in the form of continuous contact with the revolving door panel, which force is not applied by the electric motor, to maintain the speed of rotation of the revolving panel. The speed of rotation of the revolving panel is preferably measured by means of an incremental sensor. The revolving door panels, which are mounted centrally, are normally located inside two drum walls which, as a rule, are interrupted by entrances and exits which are located diametrically opposite one another. A conventional electronic safety system, e.g., sensors etc., is normally essential for the safe operation of such a revolving door.

For the panels of a revolving door which is propelled by an electric motor, a complex and expensive system of sensors is generally necessary to ensure the safety of the persons using the door. This system can consist of switch mats, sensor strips, light-beam curtains, infrared and radar sensors and photoelectric barriers. All these sensors, in themselves, make possible the safe operation of such a revolving door. But because such safety sensor systems are increasingly integrated into the revolving door itself, it can happen that the normal operation of the door can be interfered with by the functioning or even malfunctioning of all these different safety systems. In other words, there are a good many emergency shutdowns of the revolving door, which generally require manual intervention by a person trained in maintenance and repair of the door.

A known revolving door of the type described above is disclosed in European Patent 0 340 771 A1. The individual door panels are fastened in a central area and are driven by a drive motor.

German Patent 39 34 662 A1 describes a revolving door which is provided with a safety circuit and an electric inertial mass which can be electrically decelerated or stopped. A programmable open-loop control system equipped with a microprocessor controls the operation of the door and also makes it possible for the safety sensors and devices to guarantee a smooth operation of the door.

In addition to the revolving doors described above, known are doors which are not equipped with a drive motor. These manually operated revolving doors are generally of limited diameter, since the person using the door must manually set the panels of the revolving door in motion by pushing them. But such an effort is often difficult or even impossible for older persons or physically handicapped persons. On account of the absence of a drive systems, these manually operated revolving doors do not have any type of safety equipment, but they are also severely restricted in terms of size.

OBJECT OF THE INVENTION

An object of the invention is the provision of an operating method for the open-loop and closed-loop control and regulation of a motor-driven revolving door which makes it possible to eliminate the safety sensors or safety devices for the user which are otherwise necessary for the safe operation of such a door. A further object is to make it possible for physically handicapped persons and for older people to operate the inventive revolving door without having to exert a great deal of force.

SUMMARY OF THE INVENTION

The present invention teaches that these and other objects can be accomplished if the door is driven by an open-loop/closed loop microprocessor control system and operates with the electric propulsion system only in a quasi-assistance mode or servo operation, whereby the person using the door must also contribute to the power assist. To set a revolving door of this type in motion, a manual force in the direction of movement must be applied by the person using the door on at least one of the panels of the revolving door. As a result of this manual force, the panels of the door are set in motion, and thus an acceleration is transmitted to the open-loop/closed loop microprocessor control system by the measurement results transmitted by the incremental sensor. The open-loop microprocessor control system thereby recognizes that the panels are experiencing a rotational motion, and then makes certain that the electric motor drive assists this rotational velocity. This assistance can be explained as follows: From the measured circumferential velocity $v_m$ of the panel of the door, or from the accelerating power of the door panel, caused by the manual force (actuation force) exerted by the person using the door, the open-loop/closed loop microprocessor control system calculates an assistance velocity $v_u$, which is less than the total (or circumferential) velocity $v_m$ by an amount $\Delta v$. The following formula results for the assistance velocity $v_u$ of the panels of the revolving door:

$$v_u = v_m - \Delta v$$

The total (or circumferential) velocity $v_m$ of the panels of the revolving door is composed of the assistance velocity $v_u$ produced by the electric motor, and the difference $\Delta v$ from the manual force and thus the velocity of the panel $v_m$, whereby after the brief start-up phase of the door panel, only a significantly lower force needs to be applied by the user, which corresponds to the velocity $\Delta v$. It can thus be said that the manual force is proportional to the velocity Δv. When a large force is applied, the velocity of the door panel is high, and when a small force is applied, it is low. This relationship makes it clear that the total velocity of the door panels is a function of two components, the manual velocity and the assistance velocity provided by the electric motor. As a result of these requirements, it is possible to keep the door panel from running away from the person, because continuous contact with the door panel is necessary to keep the door panel in motion.

To create a control system in which the electric motor operates in an assistance mode, it is necessary for the total (or circumferential) velocity of the door panel $v_m$ to be measured by the incremental sensor, and processed on the basis of a selected program in the open-loop/closed loop microprocessor control system.

It is apparent that $v_u$ will always be less than the total (or circumferential) velocity $v_m$. The value of Δv can thereby be set, so that it is possible to regulate or to control the revolving door as a function of the site where it is installed, so that the assistance mode is set to a level which is appropriate for the persons using the door. Such a measure may be necessary in particular on doors which have different diameters.

The above discussed embodiments of the present invention will be described further hereinbelow with reference to the accompanying figures. When the word "invention" is used in this specification, the word "invention" includes "inventions", that is, the plural of "invention". By stating "invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

In summary, one aspect of the invention resides broadly in apparatus for driving the rotation of a revolving door about a central axis of the revolving door in response to the entry of a user thereinto, the revolving door including the central axis, a plurality of door panels extending radially outward from the central axis, a drive motor for supplying a rotational torque to the revolving door, and a control circuit for controlling the torque supplied to the revolving door by the drive motor, said apparatus comprising:

means for sensing the magnitude of at least one of:
a force applied by the user to at least one of said plurality of door panels; and
a rotational velocity imparted by the user to said revolving door; and
means for operating said control circuit to cause said drive motor to supply a rotational torque to said revolving door that is substantially proportional to said sensed magnitude of said at least one of said user applied force and said user imparted velocity.

Another aspect of the invention resides broadly in apparatus for driving the rotation of a revolving door about a central axis of the revolving door in response to the entry of a user thereinto, the revolving door including the central axis, a plurality of door panels extending radially outward from the central axis, a drive motor for supplying a rotational torque to the revolving door, and a control circuit for controlling the torque supplied to the revolving door by the drive motor, said apparatus comprising:

means for sensing the magnitude of a user supplied parameter; and means for operating said control circuit to cause said drive motor to supply a rotational torque to said revolving door that is substantially proportional to said sensed magnitude of said user supplied parameter.

BRIEF DESCRIPTION OF THE DRAWINGS

The invention is explained fully below, with reference to one possible embodiment, which is illustrated schematically in the accompanying drawings.

FIG. 1' shows a revolving door in an overhead view.

DESCRIPTION OF THE PREFERRED EMBODIMENT

Figure 1A:
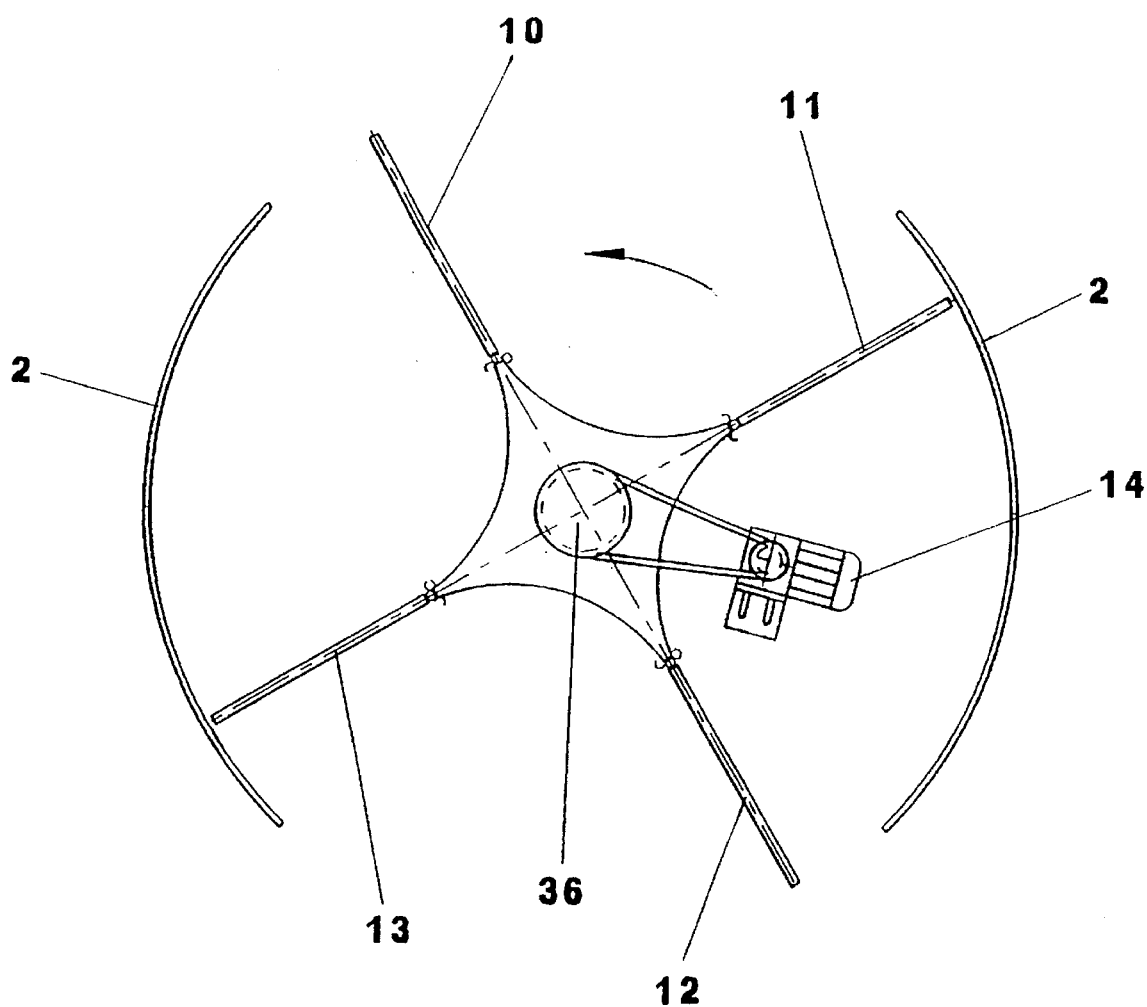
FIG. 1 is a plot of velocity vs. time.

With reference to FIG. 1, as the result of a force exerted on at least one of the panels of a door, the door is placed in motion. On the basis of the startup ramp 8 stored in the open-loop/closed-loop microprocessor control system, the total velocity $v_m$ increases up to point 3. The total velocity, however, does not consist solely of the velocity provided by the person operating the door, but also includes the velocity provided by the electric motor, which contributes its share to the total velocity $v_m$ with the curve 4 $v_u$. Only the remainder of the force, from the assistance velocity $v_u$ to the total velocity $v_m$, is the Δv which must be supplied by the person. If the force applied by the person does not continue to increase, the curve makes a transition from the area of the startup ramp 8 into a uniform linear velocity of the revolving door panel, namely, the velocity 9. This velocity is maintained until, for example, a force is no longer applied to the door panel. As a result of the discontinuation of the force, the total velocity $v_m$ decreases at point 10, because the person is no longer assisting the motion. The lines of velocity 9 and 4 thus intersect at point 1, and on account of the coasting ramp 7 stored in the open-loop/closed-loop microprocessor control system, the velocity of the door panel is reduced to zero. This deceleration according to the coasting ramp 7 imitates the deceleration of the panels of a purely manual revolving door.

If we consider the energy content of the areas underneath the curves, it is apparent that the kinetic energy provided by the drive system 5 is several times greater than the kinetic energy provided by the person 6. Therefore the drive does not provide the full drive power, but only provides assistance.

On an existing revolving door with known characteristics, the Δv may be constant, and can be indicated, for example, as a percentage of the assistance velocity $v_u$ which must be applied manually, and is stored in a corresponding non-volatile memory, so that it can be processed by the selected program. Regardless of the portion of the circumferential velocity of the door panel which must be provided by manual force, the assistance velocity of the electric motor is a fixed component of the total velocity, so that at low and high circumferential velocities of the door panel, there is always a velocity difference, and the door does not run away from the person using the door on account of the requirement of continuous pressure on the individual door panels. Following the brief startup phase, during which a greater force must be applied, a lower force is subsequently required to move the panels than is normally the case with revolving doors which are operated purely manually. Nevertheless the person pushing the door determines how fast the door panels should move. The invention teaches that the electric motor provides assistance for the instantaneous velocity, but that the assistance velocity of the door is always below the manually required or desired speed of rotation of the door panel. This assistance mode makes the door easy to operate, because only a slight force has to be applied to actuate the door panel.

To start a stationary revolving door, as an alternative to the procedure described above, the door can also be actuated by means of a contact, switch, button, by the detection of force, by means of strain gauges, or by another suitable electrical or electronic sensor system. But pressure must still then be applied to the door panel.

In this type of operation for a revolving door, it is necessary for the person using the door to maintain continuous contact with the door panel during the revolving motion of the door panel. If the direct contact is interrupted, the velocity of the door panel decreases, and it begins to coast to a stop. The coasting is produced by a deceleration curve or coasting ramp which is stored in a memory, and which imitates the coasting to a stop of a door which is operated manually.

When a constant force is exerted on the door panel, the door moves at a constant velocity. If this force is increased, thereby increasing the velocity, the Δv in the component remains the same, i.e., greater assistance is provided by the electric motor. When the manual assistance decreases, the motor support begins to turn off.

A revolving door which is operated on the basis of the method described above can be operated without safety sensors for the persons using the door. The total (or circumferential) velocity is determined solely and exclusively by the person using the door. If there are several persons inside the space between the door panels, the person who exerts the greatest force on his or her door panel determines the speed of revolution. But it is also possible for another person, for whom the circumferential velocity is too high, to exert a braking action by holding back on the door panel in front of him, thereby reducing the circumferential velocity of the revolving door. The teaching of the invention, in accordance with at least one preferred embodiment, is thus not only that the velocity of the revolving door is controlled on the basis of the velocity determined by the person using the door, but also that there must simultaneously be continuous contact between this person and the door panel. That should generally be considered the equivalent of a manually operated revolving door.

With regard to the sensor system installed on a revolving door, a distinction must be made between a sensor system for the normal operation of a door and the safety sensor system. The operating sensor system of the invention can, for example, consist simply of a tachometer generator or an incremental sensor which measures the circumferential velocity of the door panels. In contrast, a more elaborate safety sensor system is generally necessary for the safety of the persons who use a standard revolving door. This type of safety system can consist of photoelectric barriers, infrared sensors, contact mats, sensor strips, radar devices etc. All these safety sensors increase the cost of the revolving door enormously. With the operating method by the invention, it is therefore possible to eliminate all these sensors while simultaneously guaranteeing safe operation of such a door, thereby presenting the operator with an economical alternative to a revolving door operated on the basis of the methods of the prior art.

It is also conceivable that a person can actuate a switch, button or sensor to set the door in motion. But in that case, it is absolutely essential to make contact with and apply pressure to one of the door panels, so that the force and thus the circumferential velocity of the panels of the revolving door can be measured, so that the drive can provide assistance.

Figure 7:
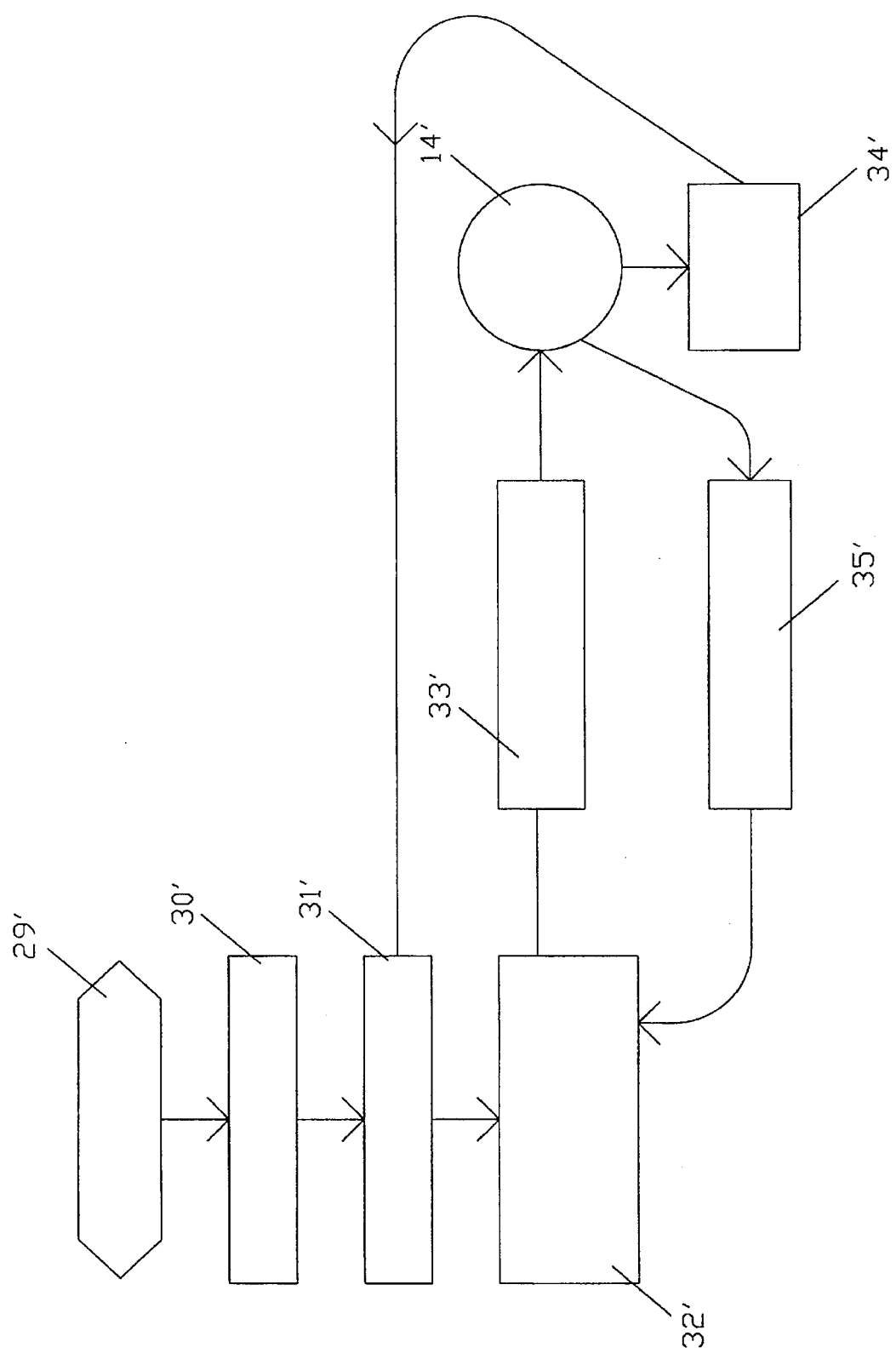
FIG. 7' is a block diagram of the drive motor control unit.

FIG. 1' is a schematic illustration of a revolving door in an overhead view. Between two drum walls 2', there are panels 10', 11', 12' and 13' of the revolving door which are fastened rotationally at a center point. The panels 10', 11', 12' and 13' are connected to a drive motor 14' by means of a drive wheel 36'. To set the panels 10', 11', 12' or 13' in motion, a pressure must be exerted by at least one person on at least one of these panels. Since the pressure or the force is proportional to the velocity, for purposes of simplicity, in the following embodiment, reference is made primarily to the velocity. The increasing peripheral velocity of the panels 10', 11', 12' and 13' of the revolving doors follows a quasi-ascending ramp during the startup phase 8', as shown most particularly in FIGS. 2' and 3'. The actual velocity 15', which increases from zero to its final value and is initiated by manual contact, continues to increase as long as the person continues to exert a higher pressure on one of the panels 10', 11', 12' or 13'. As the panels 10', 11', 12' and 13' begin to revolve, the velocity is determined by a peripheral velocity measurement device 34' (shown in FIG. 7'), e.g., by means of an incremental sensor or a tachometer generator. The actual velocity is thereby measured cyclically, whereby the cycle time is adjustable. At the same time, an open-loop/closed-loop microprocessor control system 32' is informed by means of a velocity monitor/detector 31' of a door activation system 30', that the door panels 10', 11', 12' and 13' are no longer stationary. The velocity measurement device 34' then reports any change in the velocity to the velocity monitor/detector 31' and thus to the open-loop/closed-loop control system 32'. This signal is an indicator that the drive motor 14' must be activated by means of a drive unit 33' of the open-loop/closed-loop control system 32', because the system does not require the person operating the door to reach the actual speed alone and thus to apply all the force required. A power assist (37' in FIG. 2' and 16' in FIG. 3') is thereby preferably realized by means of a pulse width modulation, which follows the curve of the actual speed 15' of the force exerted manually in specified steps. But in any case, continuous contact with the panel of the revolving door must be maintained. If the velocity of the door panel increases, the level of the power assist 16' will also increase up to a maximum value.

When a revolving door of the type described above is initially actuated manually, it runs through a learning cycle, during which is measures all the necessary parameters of the door and stores them in a non-volatile memory. One of these parameters is also the current absorbed by the drive motor 14'. The current measurement device 35' thus continuously reports the instantaneous current absorbed by the drive motor 14' to the open-loop/closed-loop control system 32'.

When no increase in the current speed 15' of manual operation is measured, the open-loop/closed-loop microprocessor control system 32' begins the phase of uniform motion. In this range, too, the power assist function continues to be provided, thereby boosting the speed at a level below the actual speed of the door panels 10', 11', 12', 13'.

Figure 3:
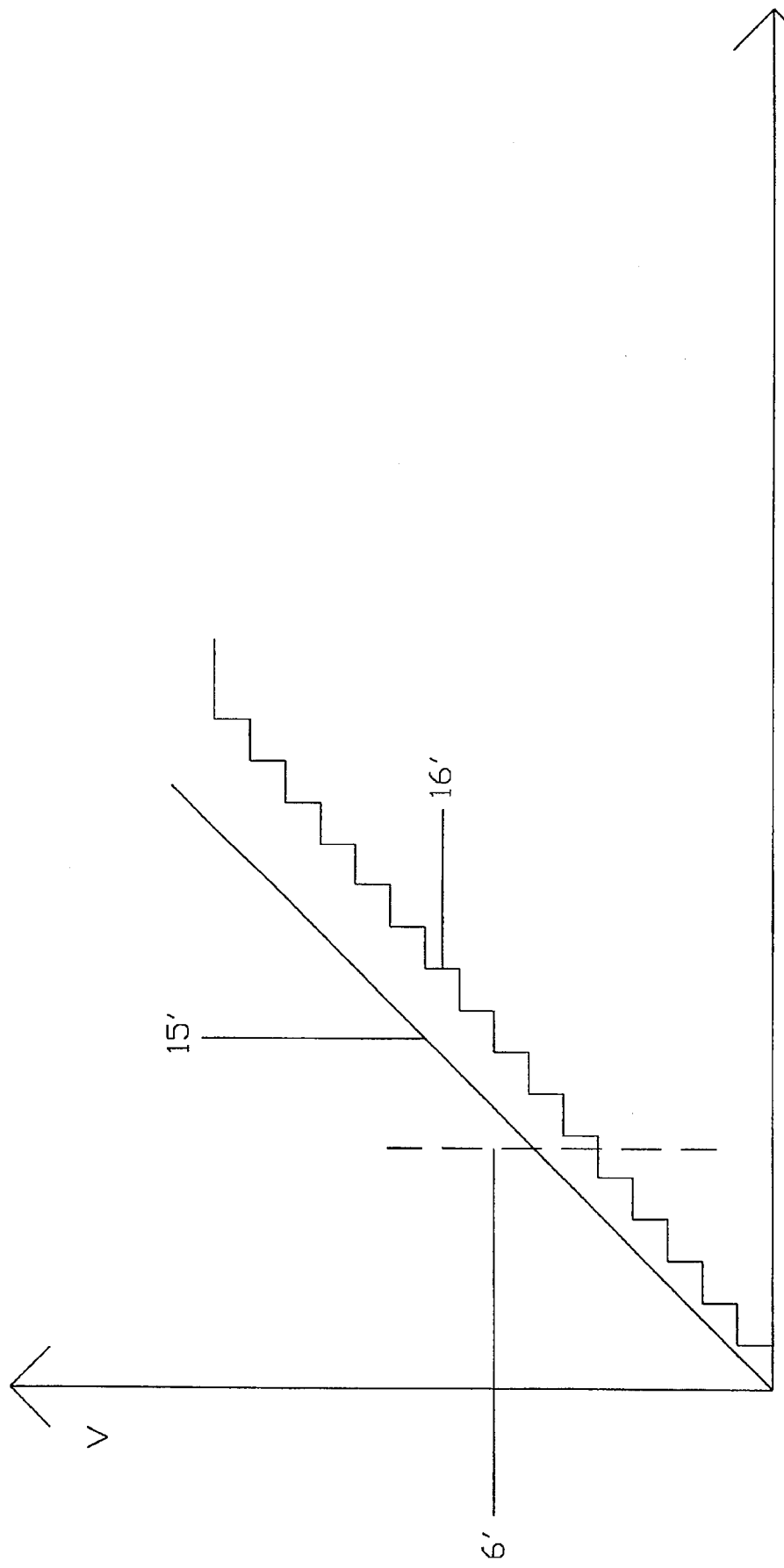
FIG. 3' is an ascending ramp (acceleration).
Figure 4:
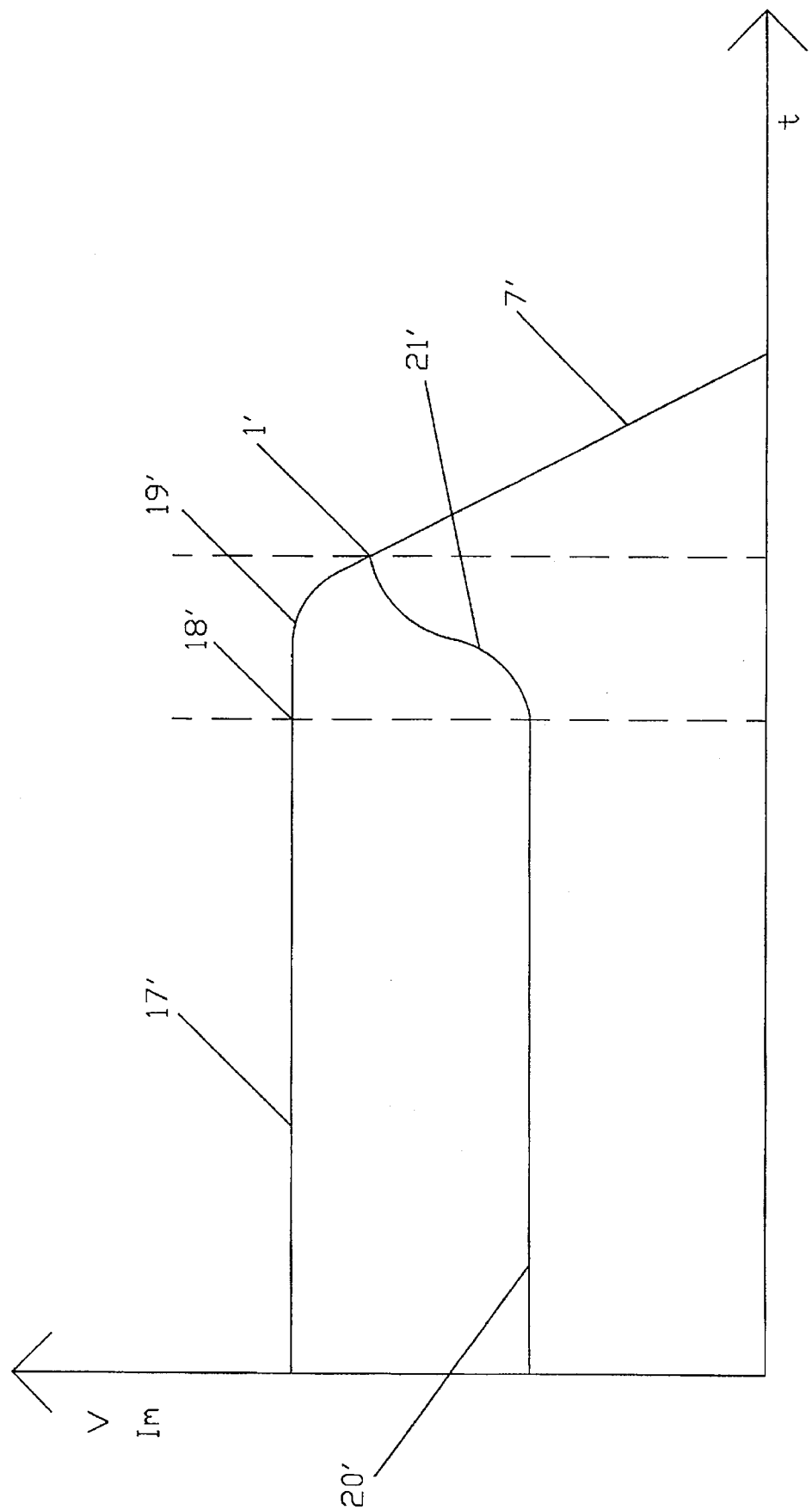
FIG. 4' shows continuous motion and the detection of disconnect point.

This uniform motion is illustrated in FIG. 4', in which, in addition to the velocity over time, the motor current (Im) is also plotted over time. If the manual boost 17' is a uniform motion, then the magnitude of the motor current 20' is also uniform. If the motion is uniform, the velocity is continuously measured by means of the velocity detection device 34', and the current absorbed by the drive motor 14' is measured by means of the current measurement device 35'. If the velocity of the door panels increases, an ascending ramp like the one illustrated in FIG. 3' is established. But there are also restrictions which are integrated in this mode of operation, which are specified by the determination of the parameters learned by the revolving door during its learning cycle. For example, if the current absorbed by the motor remains below a specified upper disconnect limit, the open-loop/closed-loop microprocessor control system 32' performs only a monitoring of this condition, because the remaining portion of the required current speed must be applied by the person using the door. But as soon as manual assistance is no longer being provided, i.e., if the manual assistance 18' were discontinued (as at 18' in FIG. 4'), the system would detect a velocity decrease 19', which would in turn result in an increase of the current 21' absorbed by the motor. This increase of the absorbed current 21' is tolerated by the open-loop/closed-loop microprocessor control system 32' until there is an intersection 1 with the parameters learned by the system, which intersection 1 is specified by the program. If this point is reached, the disconnect limit of the motor current 21' is also reached, and after a specified disconnect recognition time, the motor is brought to a stop by means of a descending coasting ramp 7', shown in FIG. 5'. This coasting ramp 7' imitates the normal coasting of a manual door, and like the startup phase 8', is preferably realized by means of pulse width modulation, e.g., by a series of current pulses of decreasing time duration. As a result of the detection of the fact the door is supposed to coast, the descending coating ramp 7' is carried out, because even in the event of a direct disconnection of the drive motor 14', the motor would continue to turn as the door coasted to a stop, which would in turn be detected by the velocity detection system 34' as a repeated passage of persons through the door, although that would not be the case. On the basis of this method of operation, the sequence of motions is realized just as in a manual door. If the door is no longer contacted by a person, after the decrease of the total energy of rotation, the door comes to a stop. The door can only be reactivated from the starting position 29' by setting the panels 10', 11', 12' and 13' in motion, which is in turn detected by the door activation system 30' and reported correspondingly to the open-loop/closed-loop microprocessor control system 32'. This illustrates that the servo assist is realized only in response to the exertion of a manual force, i.e., contact with one of the door panels 10', 11', 12', 13'. The servo assist is thereby permanently monitored by the control software. As a result of this method of operation, it becomes clear that the sequence of motion in the servo mode of such a revolving door corresponds to the manual operation of the door, and thus does not require any system of safety sensors for the person operating the door.

On account of the method of operation described above, it is apparent that a different pressure or even tension on one of the door panels will be detected by the velocity measurement device 34' and also by the current measurement device 35', and this interaction will be reflected either in a startup phase 8' or in a coasting ramp 7'. It is thereby apparent that a change in velocity, but only an increase, is an indicator for the open-loop/closed-loop microprocessor control system 32' to once again increase the peripheral velocity. On the other hand, the current measurement is required to more precisely detect the disconnect point.

Figure 2:
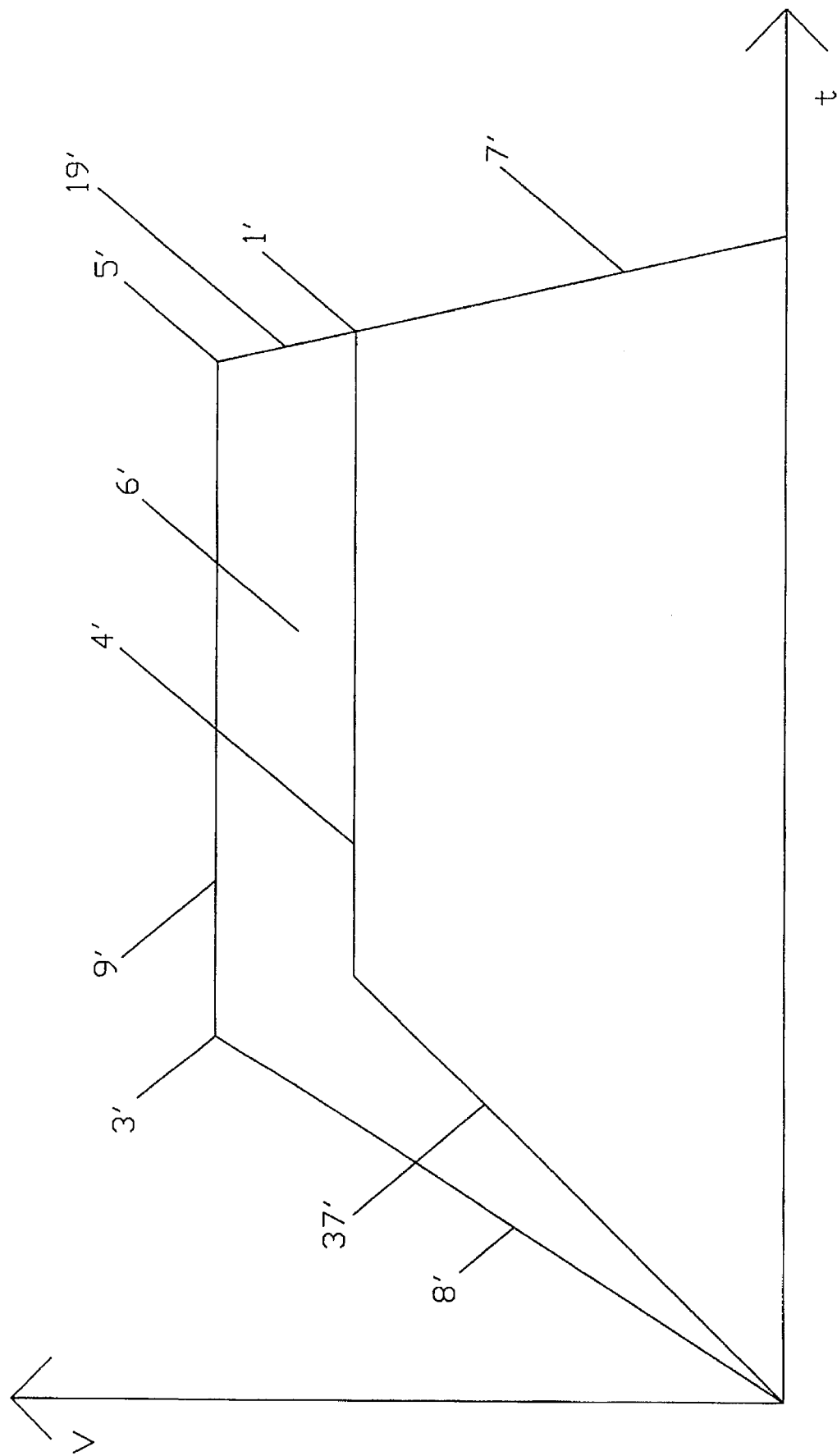
FIG. 2' is a diagram of velocity/time.

In the diagram in FIG. 2', which shows the velocity plotted over time, the start-up phase 8' is presented in the front area. With a certain lag, this start-up phase 8' follows the power assist 37' provided by the motor up to the point where the curve is deflected into the uniform velocity 3'. At the total velocity 9' it is apparent that the booster velocity 4' is always less than the total speed, and thus the velocity difference 6' [delta]v is the component of the velocity which must be supplied by the person using the revolving door. If the uniform velocity ceases at point 5', i.e., if contact with one of the panels 10', 11', 12' or 13' of the revolving door is interrupted, there is a decrease 19' in the velocity, and at the instant the open-loop/closed-loop microprocessor control system 32' recognizes that this is a coasting ramp 7', the ramp is run according to the program, because the current 20' absorbed by the motor increases on account of the absence of contact with the door panels, and thus the drive motor 14' must keep the door panels 10', 11', 12' and 13' in rotation all by itself. But since the drive motor 14' need not supply the total peripheral velocity, on account of the control program, the coasting phase enters the coasting ramp 7'.

Figure 5:
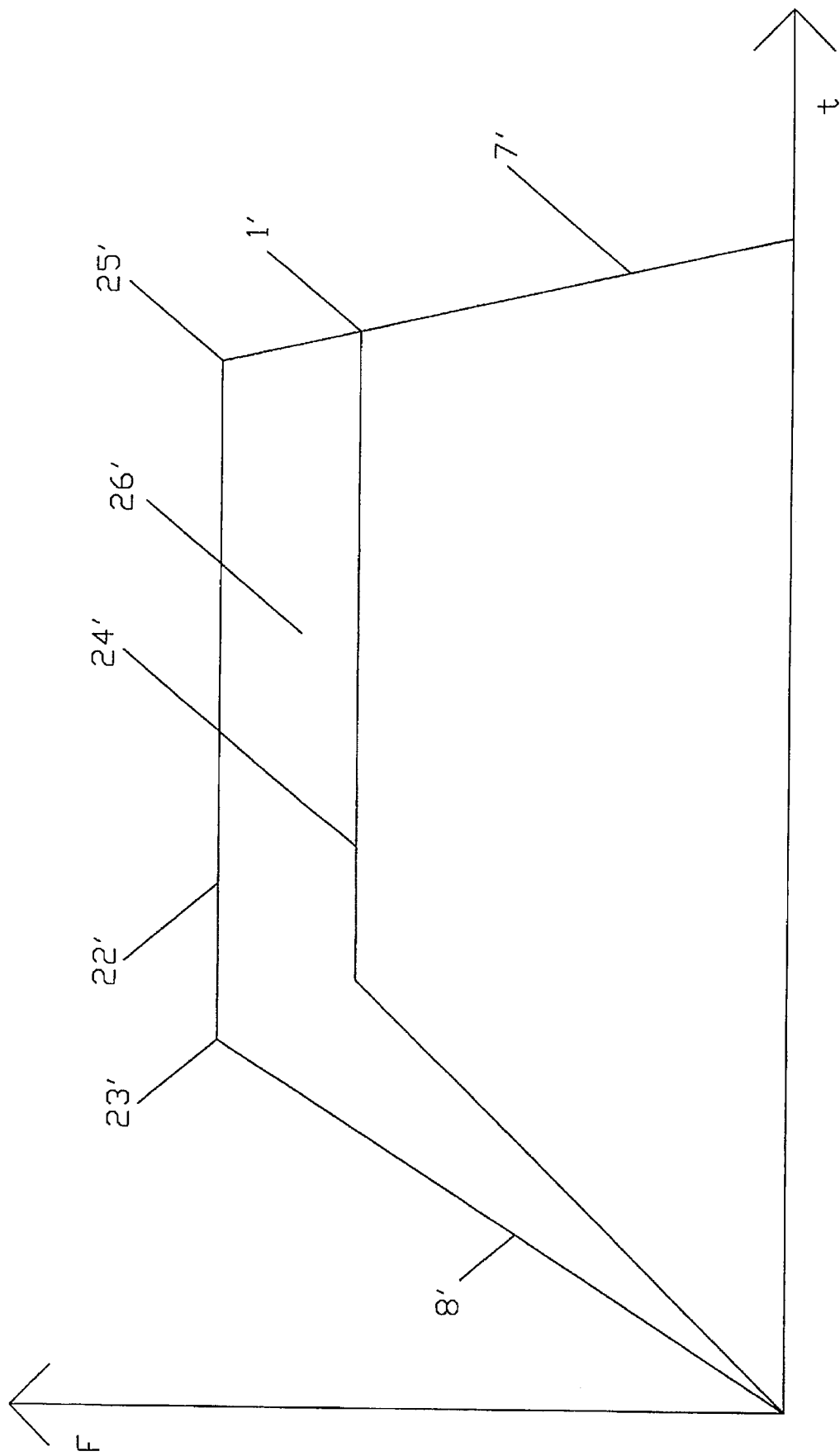
FIG. 5' is a diagram of force/time.

In addition to the criterion of velocity as a control parameter, however, the force can also be measured, as illustrated in the diagram in FIG. 5'. FIG. 5' illustrates the force to be applied plotted over time. During the startup phase 8', the force increases over time at a constant rate, until a uniform force 23' is exerted by one of the persons on the panel of the revolving door. The total force 22' is thereby composed of the booster force 24' supplied by the drive motor 14' and the differential force 26' which must be supplied by the person. As with the consideration of the velocity, in this case, too, on account of the proportionality between force and velocity, when the force 25' ceases, there is a reduction of this velocity, and thus under the control of the sequential program, the revolving door with its revolving panels 10', 11', 12' and 13' makes the transition into the coasting ramp 7'. For this application, it is also possible to take a measurement of the force directly on the door panel, e.g., using strain gauges.

Figure 6:
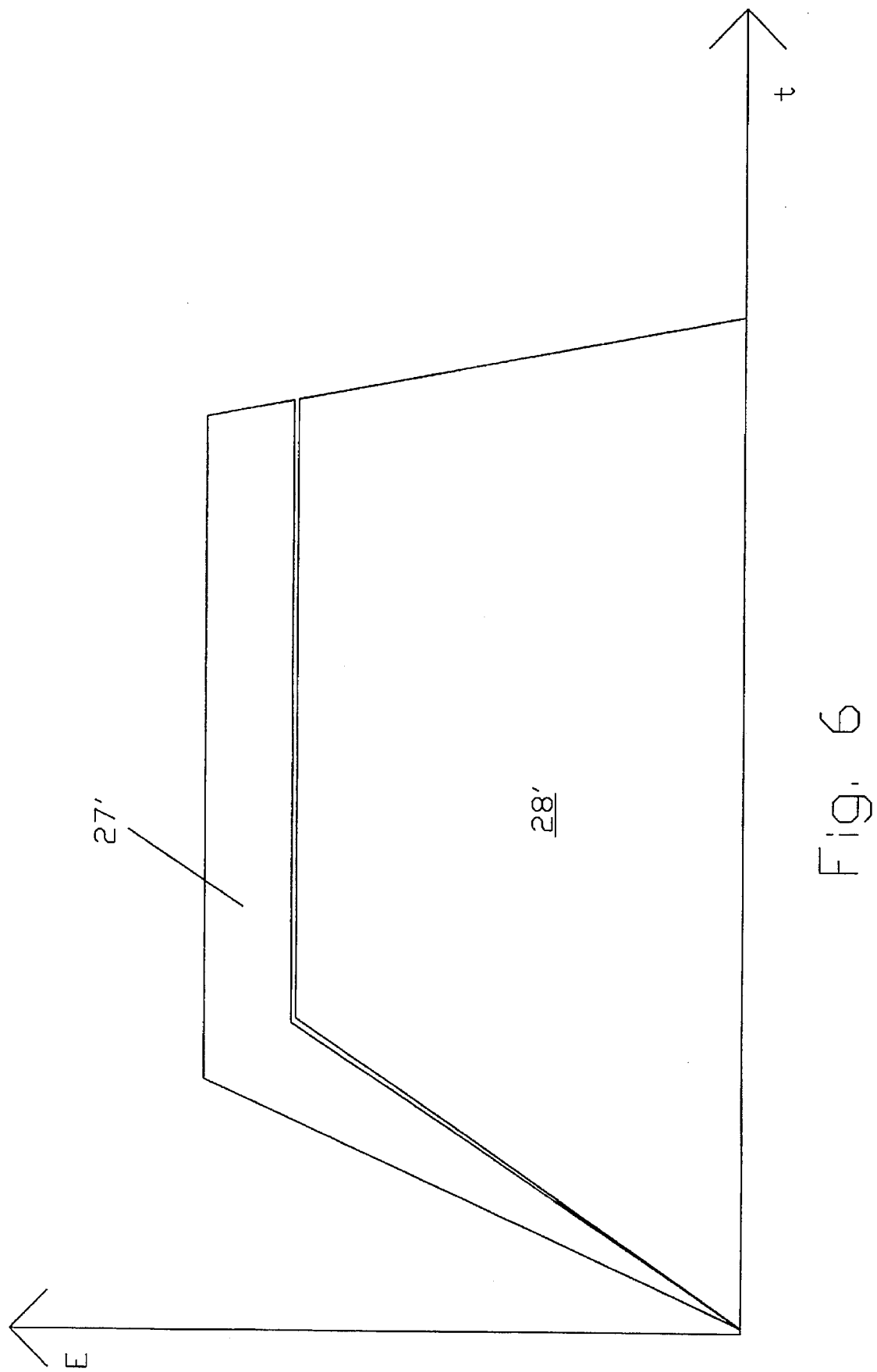
FIG. 6' is a diagram of energy/time.

On account of the computer program used, the open-loop/closed-loop microprocessor control system 32' is also able to calculate the energy contents. This situation is illustrated in FIG. 6', where the kinetic energy is plotted with respect to time. The maximum kinetic energy which must be supplied for the operation of the revolving door is supplied by the motor energy 28', whereby the manual energy 27' required is significantly less.

While the above embodiment has been described as one in which either a user applied force or a user imported velocity is sensed by the control circuit, in another embodiment, various other methods can be employed to sense the presence and/or movement, such as, for example, proximity detectors, a change in capacitance, etc.

Figure 8:
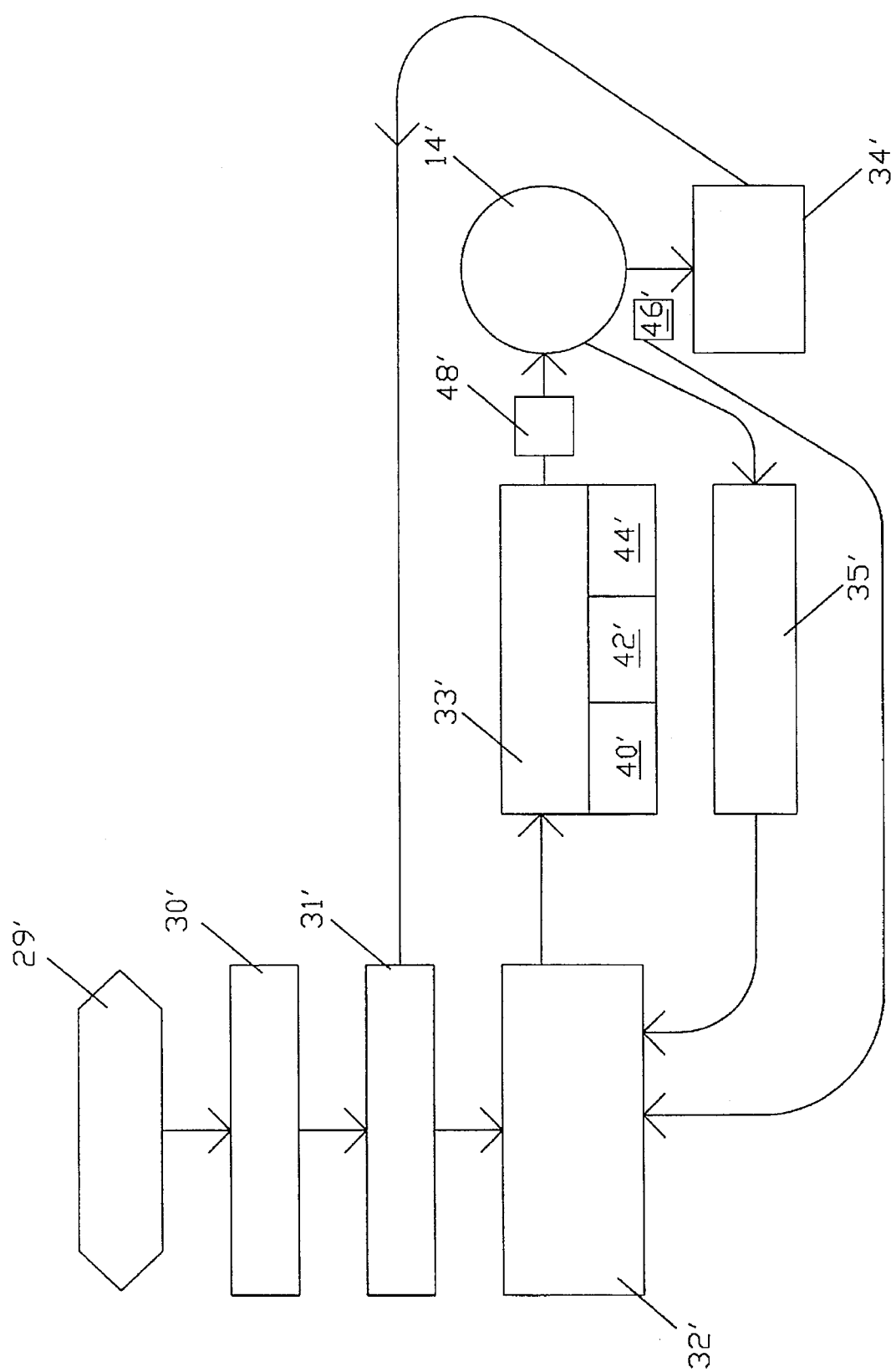
FIG. 8' is also a block diagram, however illustrating the drive motor control in more detail.

FIG. 8' shows additional control elements which may be included in one embodiment of the invention. There, the drive unit 33', which controls the drive motor 14' may include control circuitry (e.g., either hard wired or in the form of portions of the program executed by the open-loop/closed-loop microprocessor control system 32') as follows:

a ramp up control circuit 40' which, upon sensing either user imported velocity of the door panels 10', 11', 12', 13', causes the drive motor 14' to be operated so as to increase the drive torque supplied during an initial limited period of time of increasing rotational velocity;

a limiting circuit 42' which limits the torque supplied by the drive motor 14' to the revolving door so that it does not exceed a specified parameter of movement (e.g., rotational velocity, kinetic energy, etc.); and a ramp down control circuit 44' which serves to operate the drive motor 14' so as to decrease the torque supplied to the revolving door during a limited terminal period of time during which the rotational velocity of the revolving door is decreased.

In one embodiment, the ramp down control circuit 44' may include circuitry for causing the rotational velocity of the revolving door to decrease in a manner which closely resembles the natural coasting to a stop of a non-powered revolving door. This may be implemented, for example, in the form of a so-called "look up table" in memory (e.g., ROM), where the microprocessor control system 32' uses a measured parameter (e.g., velocity) to access data stored in the memory to operate the drive unit 33' such that the revolving door appears to coast to a natural stop.

Also shown in FIG. 8' is an initial activation switch 46', the state of which, in one embodiment, is determined by the microprocessor control system 32', which operates to supply torque to the revolving door only if the initial activation switch 46' has been actuated, regardless of whether any user applied force or user imported velocity has been detected.

Figure 9:
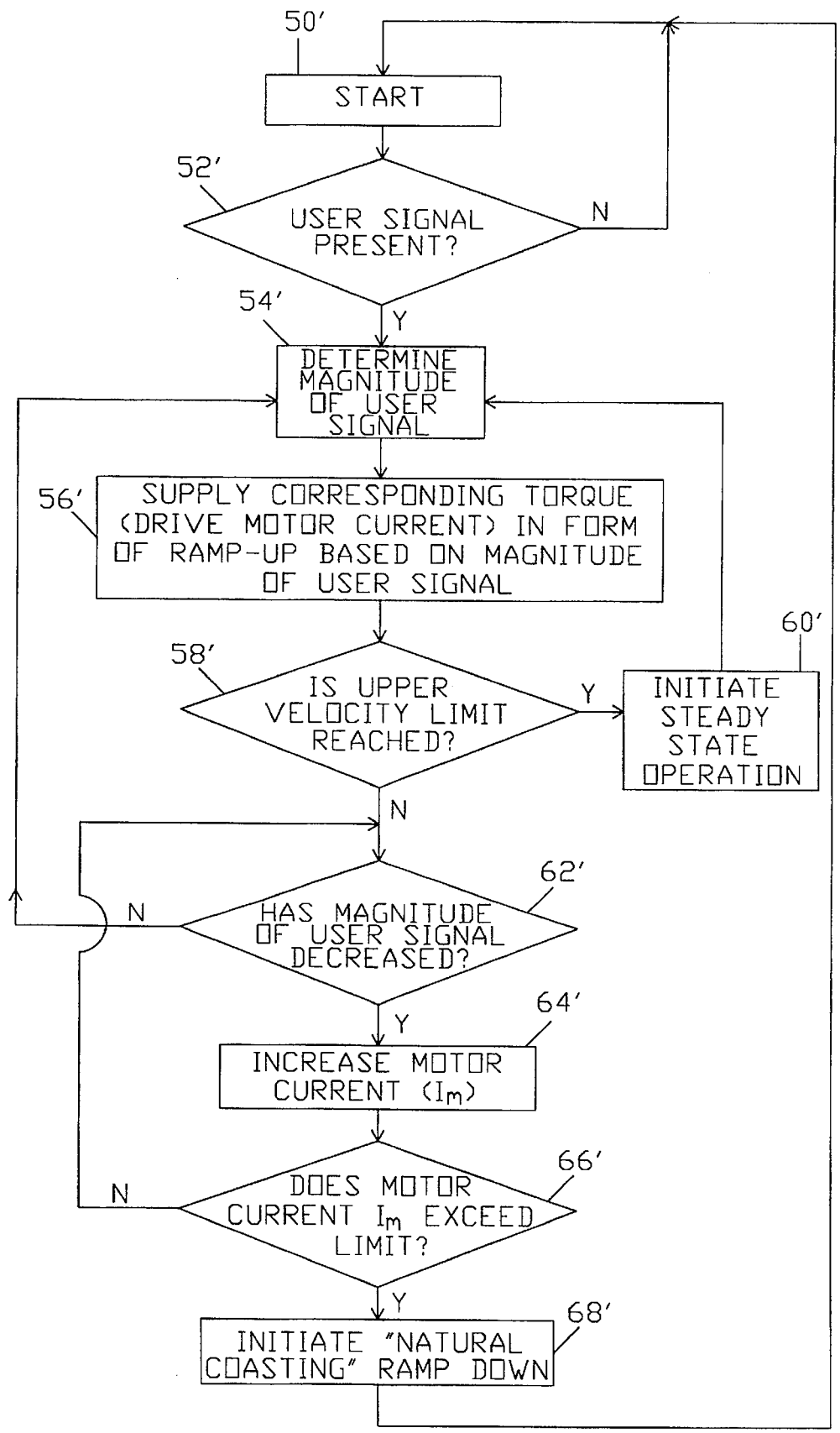
FIG. 9' is a flow chart illustrating the operation of the open loop/closed loop microprocessor control system.

FIG. 9' is a flow chart illustrating the logic employed by the microprocessor control unit 32' in controlling the rotational torque supplied by the drive motor 14' to the revolving door in one possible embodiment of the invention. Upon start up 50' of the control program, the microprocessor control unit 32' determines whether a User Signal, that is, for example, either a user applied force or a user imparted velocity. Upon detection 52' of a User Signal, the microprocessor control unit 32' determines the strength or magnitude of the User Signal (at 54') and, at 56', supplies a rotational torque, in the form of drive motor current (Im) which corresponds to the magnitude of the User Signal, for a higher User Signal, more drive current (Im) being supplied. Additionally, during this stage of operation, the drive current (Im) is supplied in the form of a ramp-up (i.e., substantially steadily increasing velocity profile that closely parallels but is always less than the total rotational velocity of the revolving. The appropriate velocity profile can be easily determined, for example, by accessing an emperically determined look-up table, etc.

The microprocessor control unit 32' determines (at 58') whether the rotational velocity of the revolving door has reached a specified upper limit: if so, a steady state operation is initiated at 60'; and if not, the microprocessor control unit 32' determines whether the magnitude of the User Signal has decreased of the User Signal has decreased at 62'. From both the steady state operation 60X 60 and the No output of the decision 60X 62, the control program returns to determining the magnitude of the User Signal (at 54').

Upon a Yes determination from the decision 60X 62, the control program at least temporarily increases the drive motor current (Im) by a rather small amount (at 64'), in the event the User needs additional assistance. The microprocessor 32' then determines whether the motor current (Im) exceeds a specified limit (at 66'). If not, the control program jumps back to the input of decision box 62'. If the drive motor current (Im), the control program initiates (at 68') a ramp down velocity profile, which preferably substantially corresponds to the decreasing velocity profile of an ordinary manual revolving door. During the ramp down period, the microprocessor also jumps back to decision box 52', so as to detect any new User Signal.

On the basis of the embodiments and the various measurement types and methods described above it is apparent that a revolving door can be operated according to the method of the present invention without any system of safety sensors for the persons using the door. The peripheral velocity of the door panels 10', 11', 12' and 13' is determined solely and exclusively by the person using the door, i.e., if there are several persons in the individual spaces between the panels, the person who exerts the maximum force on the door panel in front of him determines the maximum speed of revolution of the door panels. But it is also possible that another person, for whom the peripheral velocity of the door panel is then too great, may exert a braking action, e.g., by pulling back on the door panel in front of him. Consequently, the overall peripheral speed of the door panels will be reduced.

On account of the requirement for constant contact on the door to be maintained by the individual persons using the door, this method of operation can be considered equivalent to a manual revolving door. Consequently, the safety sensor system which would otherwise be necessary can be eliminated.

With regard to the sensor system installed on a revolving door, a distinction must be made between a sensor system for the normal operation of a door and the safety sensor system. The operating sensor system can, for example, consist of a tachometer generator or an incremental sensor which measures the total velocity of the door panels. The safety sensor system is necessary for the safety of the persons who use a motor-driven revolving door. This type of safety system can consist of photoelectric barriers, infrared sensors, contact mats, sensor strips, radar devices, etc. All these safety sensors increase the cost of the revolving door enormously. With the operating method of the present invention, it is therefore possible to eliminate all these sensors, while simultaneously guaranteeing safe operation of such a door, thereby presenting the operator with an economical alternative to a revolving door operated on the basis of known methods.

The activation of the door from a stop need not be realized only by pressing on the panels, but a person can also actuate a switch, button or sensor to set the door in motion. But in that case, it is generally essential to make contact with and apply pressure to one of the door panels 10', 11', 12' or 13', so that the force and thus the total velocity of the panels of the revolving door can be measured, so that the drive can provide power assistance.

Some examples of the pressure sensing apparatuses and/or strain gauges which may be incorporated into an embodiment of the present invention are to be found in U.S. Pat. No. 5,241,308, entitled "Force Sensitive Touch Panel" and issued to Young on Aug. 31, 1993; U.S. Pat. No. 5,191,798, entitled "Pressure sensor" and issued to Tabata et al. on Mar. 9, 1993; U.S. Pat. No. 5,199,519, entitled "Strain Gauge Element" and issued to Polaert et al. on Apr. 6, 1993; U.S. Pat. No. 5,287,757, entitled "Strain-Gauge Transducer" and issued to Polaert et al. on Feb. 22, 1994; U.S. Pat. No. 5,303,593, entitled "Strain Gauge Distribution for Resistive Strain Gauge Pressure Sensor" and issued to Kremidas on Apr. 19, 1994; and U.S. Pat. No. 5,186,060, issued to Marlier on Feb. 16, 1993, all of these U.S. patents being hereby expressly incorporated by reference herein.

Some examples of control systems which measure operating parameters and learn therefrom are disclosed in U.S. Pat. No. 5,191,272, entitled "Method of Adjusting Gain for Motor Control" and issued to Torii et al. on Mar. 2, 1993; U.S. Pat. No. 5,223,820, entitled "Adaptive Lamp Monitor with Single Piece Sensor" and issued to Sutterlin et al. on Jun. 29, 1993; and U.S. Pat. No. 4,655,188, issued to Tomisawa et al. on Apr. 7, 1987, which U.S. patents are hereby expressly incorporated by reference herein.

Some examples of open-loop control circuits which may be incorporated in an embodiment of the present invention are to be found in U.S. Pat. No. 5,210,473, entitled "System with delay timer for motor load equalization" and issued to Backstrand on May 11, 1993; U.S. Pat. No. 5,320,186, entitled "Draft Control System with Closed Loop Drop/ Raise Rate Control" and issued to Strosser et al. on Jun. 14, 1994; and U.S. Pat. No. 5,369,342, entitled "Predictive Electric Motor Positioning Device, Calibration System Therefor" and issued to Rudzewicz et al. on Nov. 29, 1994, which U.S. patents are hereby incorporated by reference herein.

Some examples of closed-loop control circuits which may be incorporated in an embodiment of the present invention are to be found in U.S. Pat. No. 5,189,605, entitled "Control and Hydraulic System for a Liftcrane" and issued to Zuehlke et al. on Feb. 23, 1993; U.S. Pat. No. 5,223,072, entitled "Intelligent Servo-Controlled Fiber Placement Machine Tensioner" and issued to Brockman et al. on Jun. 29, 1993; and U.S. Pat. No. 5,252,901, entitled "System for Controlling Locomotion of Legged Walking Robot" and issued to Ozawa et al. on Oct. 12, 1993, which U.S. patents are hereby incorporated by reference herein.

Some examples of look up tables accessed by computers or microprocessors which may be incorporated in an embodiment of the present invention are to be found in U.S. Pat. No. 5,284,116, entitled "Vehicle Management Computer" and issued to Richeson, Jr. on Feb. 8, 1994; U.S. Pat. No. 5,359,325, entitled "Automatic Monitoring System for Airfield Lighting Systems" and issued to Ford et al. on Oct. 25, 1994; and U.S. Pat. No. 5,371,537, entitled "Method and Apparatus for Automatically Calibrating a CRT Display" and issued to Bohan et al. on Dec. 6, 1994, which U.S. patents are hereby incorporated by reference herein.

Some examples of power modifying systems which may be incorporated into an embodiment of the present invention are to be found in U.S. Pat. No. 5,355,315 issued to Daido et al. on Oct. 11, 1994; U.S. Pat. No. 5,224,564 issued to Duffy on Jul. 6, 1993; U.S. Pat. No. 5,218,769 issued to Tranchon on Jun. 15, 1993; U.S. Pat. No. 5,255,755 issued to Fu on Oct. 26, 1993; U.S. Pat. No. 5,201,818 issued to Nishimoto on Apr. 13, 1993; and U.S. Pat. No. 5,205,371 issued to Karnopp on Apr. 27, 1993, which U.S. patents are hereby expressly incorporated by reference herein.

One feature of the invention resides broadly in the operating method for the operation of a revolving door, the revolving panels of which are propelled by an electric motor, the drive action of which is controlled and/or regulated by a open-loop/closed-loop microprocessor control system, and the rotational action of which is measured by an incremental sensor, characterized by the following features: the rotating panels of the revolving door are placed in motion by a force which is exerted manually, the acceleration generated by the motion of the panels of the revolving door is measured or the overall velocity of the panels of the revolving door is determined and transmitted to the central, the open-loop/ closed-loop microprocessor control system calculates the necessary speed of rotation for the electric motor, which is less by a $\Delta v$ than the rotational speed which must be applied, which corresponds to the manually applied acceleration force or to the total velocity of the panels of the revolving door generated by the manual application of force.

Another feature of the invention resides broadly in the operating method characterized by the fact that the electric motor assistance continues as long as a manual force is exerted on one of the panels of the revolving door.

Yet another feature of the invention resides broadly in the operating method characterized by the fact that after the disappearance of the manual force, the panels of the revolving door are brought to a stop by a coasting ramp 7 specified by the open-loop/closed-loop microprocessor control system.

Still another feature of the invention resides broadly in the operating method characterized by the fact that the coasting ramp 7 corresponds to the coasting action of the panels of a manually operated revolving door.

A further feature of the invention resides broadly in the operating method characterized by the fact that the $v_u$ of the assistance can be set by the electric motor.

Another feature of the invention resides broadly in the operating method characterized by the fact that on the revolving door, no safety sensor system is required for the safety of the persons using the door.

Yet another feature of the invention resides broadly in the operating method for the operation of a revolving door, the revolving panels of which are propelled by an electric motor, the drive action of which is controlled and/or regulated by an open-loop/closed-loop microprocessor control system, and the rotational action of which is measured by an incremental sensor, characterized by the following features: the rotating panels of the revolving door are placed in motion by a control signal, after the beginning of movement of the rotating panels, a force directed in the direction of movement must be applied to at least one of the panels of the revolving door, the acceleration generated by the motion of the panels of the revolving door is measured, or the overall velocity of the panels of the revolving door is determined, and the information is transmitted to the central open-loop/ closed-loop microprocessor control system, the open-loop/ closed-loop microprocessor control system calculates the necessary speed of rotation for the electric motor, which is less by a $\Delta v$ than the rotational speed which must be applied, which corresponds to the manually applied acceleration force or the total velocity of the panels of the revolving door generated by the manual application of force.

One feature of the invention resides broadly in the operating method for the operation of a revolving door, the panels of which are driven by a drive motor which controls or regulates the operation according to an sequential program by means of an open-loop/closed-loop microprocessor control system of a drive unit, characterized by the following features: that to start the revolving door, at least one person must apply a manual force in the direction of rotation on at least one of the panels 10, 11, 12, 13 of the revolving door, that during the rotational movement of the door panels 10, 11, 12, 13, a continuous pressure must be maintained on at least one of the door panels 10, 11, 12, 13, that this force is proportional to the speed of revolution of the door panels 10, 11, 12, 13, that the drive motor 14 is regulated so that it only provides a boost for the drive force necessary to achieve the rotational velocity, whereby the total force is composed of the manual force and the force applied by the drive unit 33.

Another feature of the invention resides broadly in the operating method characterized by the fact that the speed of rotation of the door panels 10, 11, 12, 13 is measured, and the result is transmitted for processing to the open-loop/closed-loop microprocessor control system 32.

Yet another feature of the invention resides broadly in the operating method characterized by the fact that the current consumption of the drive motor 14 is measured, and the measurement result is fed into a computer program of the open-loop/closed-loop microprocessor control system 32.

Still another feature of the invention resides broadly in the operating method characterized by the fact that the startup of the revolving door is initiated by the activation of a sensor system or switch, following which at least one person must exert a manual force in the direction of rotation on at least one of the door panels 10, 11, 12, 13.

A further feature of the invention resides broadly in the operating method characterized by the fact that after the startup of the door panels 10, 11, 12, 13, the increasing speed of revolution corresponds to a startup ramp 8, the curve of which is determined by the programs run in the drive unit 33, but always remains below the startup ramp 8.

Another feature of the invention resides broadly in the operating method characterized by the fact that if the manual force exerted on the door panel is interrupted or ceases, the current consumption of the drive motor 14 increases, and a coasting ramp 7 is activated if it exceeds a value specified by a sequential program.

Yet another feature of the invention resides broadly in the operating method characterized by the fact that the coasting ramp 7 imitates the coasting of a revolving door which is operated purely manually.

Still another feature of the invention resides broadly in the operating method characterized by the fact that the coasting ramp 7 is realized by a pulse width modulation.

A further feature of the invention resides broadly in the operating method characterized by the fact that if, during the coasting ramp 7, a manual force is once again applied to the door, the drive motor 14 supplies the necessary booster force as a function of the level of the manual force applied to the door.

Another feature of the invention resides broadly in the operating method characterized by the fact that the speed of revolution of the panels 10, 11, 12, 13 is measured by means of an incremental sensor.

Yet another feature of the invention resides broadly in the operating method characterized by the fact that the speed of revolution of the panels 10, 11, 12, 13 is measured by means of a tachometer generator.

Still another feature of the invention resides broadly in the operating method characterized by the fact that a positive change in the level of force on at least one of the panels 10, 11, 12, 13 is detected as an indicator of an increase in the peripheral velocity, and the drive unit 33 supplies a greater booster force.

A further feature of the invention resides broadly in the operating method characterized by the fact that on the occasion of the initial manual activation of the revolving door, the door performs a learning cycle, and thereby measures the relevant factors of the operation of the revolving door and stores them in a non-volatile memory.

Another feature of the invention resides broadly in the operating method characterized by the fact that the booster force is determined on the basis of the parameters of the operation of the revolving door, and is permanently monitored by the open-loop/closed-loop microprocessor control system 32.

Yet another feature of the invention resides broadly in the operating method characterized by the fact that the manual force during the operating phase is always less than the force required during the start-up phase 8 to reach the peripheral velocity.

Still another feature of the invention resides broadly in the operating method characterized by the fact that the speed of rotation or change in the velocity of the panels 10, 11, 12, 13 produced by a person is measured, and this speed of rotation or change in speed is used as an indicator for the open-loop/closed-loop microprocessor control system 32 of the drive unit 33, and the drive unit 33 provides a servo power boost which is always less than the total speed.

A further feature of the invention resides broadly in the operating method characterized by the fact that at least one of the panels 10, 11, 12, 13 is placed in rotation by a person, and the kinetic energy contained in the revolving panels 10, 11, 12, 13 is measured, and the measurement is transmitted to an open-loop/closed-loop microprocessor control system 32 of the drive unit 33.

Another feature of the invention resides broadly in the operating method characterized by the fact that the kinetic energy is used as an indicator for the regulation of the drive motor 33, whereby the drive motor 33 provides only a servo power boost which is always less than the total kinetic energy.

Yet another feature of the invention resides broadly in the operating method characterized by the fact that in the vicinity of the revolving door, there is no safety sensor system of the type otherwise required for the safety of the persons using the door.

There is disclosed herein an operating method for the operation of a revolving door, in which the drive motor does not apply the entire force for the rotational movement of the panels of the revolving door. Rather, the drive motor operates in a booster mode which is realized by a closed-loop/open-loop microprocessor control in connection with a drive unit which is operated according to a sensed user supplied parameter such as, for example, a force or velocity. Since the drive motor does not supply the entire drive force, an additional portion of the force required must be applied by at least one person who wishes to pass through the revolving door. By means of continuous contact with at least one of the panels of the revolving door, this person using the door exerts a force which is measured and transmitted to the open-loop/closed-loop microprocessor control system. On the basis of this measured force, which is proportional to the speed of revolution, the open-loop/closed-loop microprocessor control system is able to calculate a value on the basis of a sequential program for the booster force supplied by the drive motor, which is always less than the total value of the force required. On such a power-assisted revolving door, the electronic safety mechanisms, such as sensors, photoelectric diodes, radar alarms, etc. which are conventionally required for safe operation of a power-driven revolving door can be eliminated. The revolving door panels, which are mounted centrally, are located inside two drum walls which, as a rule, are interrupted by entrances and exits which are located diametrically opposite one another.

A revolving door which is controlled and regulated by a data processing unit, and on which all the functions, including the control and the microprocessor, are internally and automatically monitored, is disclosed in German Patent DE 42 07 705. This door is characterized by almost completely automated operation, and in particular by the optimization of the operating safety of the user.

But in addition to the revolving doors described above, also known are doors which are not equipped with a drive motor. These manually operated revolving doors are generally of limited diameter, since the person using the door must manually set the panels of the revolving door in motion by pushing them. But such an effort is difficult or even impossible for older persons or physically handicapped persons. On account of the absence of drive systems, these manually operated revolving doors generally do not have any type of safety equipment. But on account of these factors, they are also severely restricted in terms of size, so that they cannot be used in all locations and applications where a revolving door might be appropriate. But if an automated revolving door is selected, then depending on the location where the door is to be installed, a complex and expensive system of sensors may be necessary to guarantee the safety of the persons using the door. These safety mechanisms can include switch mats, sensor strips, light beam curtains, infrared and radar sensors as well as photoelectric diodes. All these sensors, in themselves, make possible the safe operation of such a revolving door. But on account of the high level of safety required of such a revolving door, the normal operation of the door can be interrupted by the functioning or even malfunctioning of all these different safety systems, i.e. there are a good many emergency shutdowns of the revolving door, which generally require manual intervention by a person trained in maintenance and repair of the door. The cost situation of an automated revolving door compared to a manually operated revolving door without an electronic sensor system must also be taken into consideration.

The invention teaches that this object can be accomplished if the door is driven by an open-loop/closed loop microprocessor control system and is run only in a booster mode or servo operation by a drive unit in connection with a drive motor. Since the drive motor only provides a power assist, at least one of the persons who wants to go through the revolving door must exert an additional force on one of the panels of the revolving door. This force applied in the direction of motion of the panels of the revolving door is simultaneously an indicator that a person is passing through the revolving door. The open-loop/closed-loop microprocessor control system thus recognizes that there is a speed of revolution of the panels, and for its part then makes certain that the electric motor drive provides a boost for this speed of revolution. This boost can be explained as follows: On the basis of the measured peripheral velocity and/or the acceleration of the panels of the revolving door caused by the manual force (actuation) applied by the person using the door, the open-loop/closed-loop microprocessor control system calculates a booster velocity, the magnitude of which is less than the peripheral velocity of the panels of the revolving door.

The total velocity of the panels of the revolving door is composed of the booster velocity generated by the drive motor, and the difference from the manual force and thus the velocity of the panel. After the brief start-up phase of the door panel, i.e., after the effects of friction have been overcome, the force which must be supplied by the user is significantly less than at the beginning of the actuation, or on a revolving door which is operated purely manually, because the drive motor in this case provides a large part of the necessary power assist. It can thus be said that the manual force is proportional to the velocity. When a large force is applied, the velocity of the door panel is high, and when a small force is applied, it is low. This relationship makes it clear that the total velocity of the door panels is a function of two components, the manual velocity and the booster velocity provided by the electric motor. As a result of these requirements, it is possible to keep the door panel from running away from the person using the door, because continuous contact with the door panel must be maintained so that the speed of revolution of the door does not decrease.

But the boost provided by the drive motor requires control by a sequential program which, for its part, requires information on the speed of revolution of the panels of the revolving door and on the current being supplied to the motor. For this reason, the speed of revolution must be measured, e.g., by an incremental sensor, a tachometer generator or other means of measurement. The result is then transmitted to the open-loop/closed-loop microprocessor control system, where it is processed on the basis of the program stored there. The peripheral velocity of the panel of the revolving door is thereby used to evaluate the speed curve, whereby the measured motor current consumption is an indicator for the dynamic performance (or control response) of the motor.

The magnitude of the boost provided by the drive motor can be indicated, for example, as a percentage of the measured final value of the instantaneous velocity. The amount of boost provided can be adjusted, so that it is possible to regulate or to control the revolving door as a function of the different locations in which the door can be installed, e.g., for doors with different diameters.

The operation of a revolving door of the type described above can thus be considered in three phases:
1. Startup (ascending ramp);
2. Uniform motion, recognition of the disconnect point; and
3. Reduction of the velocity to zero.

In recapitulation, the present invention can generally relate to an operating method for a revolving door in which the peripheral velocity of the panels of the revolving door consists of a booster component provided by a drive motor and a force which must be applied to at least one of the panels of the revolving door.

In further recapitulation, there is disclosed a method for driving the rotation of a revolving door about a central axis of the revolving door in response to the entry of a user thereinto, the revolving door including the central axis, a plurality of door panels extending radially outward from the central axis, a drive motor for supplying a rotational torque to the revolving door, and a control circuit for controlling the torque supplied to the revolving door by the drive motor, said method comprising the steps of: sensing the magnitude of at least one of: a force applied by the user to at least one of said plurality of door panels; and a rotational velocity imparted by the user to said revolving door; and operating said control circuit to cause said drive motor to supply a rotational torque to said revolving door that corresponds to said sensed magnitude of said at least one of said user applied force and said user imparted velocity.

There is also disclosed herein a method for driving the rotation of a revolving door about a central axis of the revolving door in response to the entry of a user thereinto, the revolving door including the central axis, a plurality of door panels extending radially outward from the central axis, a drive motor for supplying a rotational torque to the revolving door, and a control circuit for controlling the torque supplied to the revolving door by the drive motor, said method comprising the steps of: sensing the magnitude of a user supplied parameter; and operating said control circuit to cause said drive motor to supply a rotational torque to said revolving door that corresponds to said sensed magnitude of said user supplied parameter.

Further examples of general components relating to revolving doors may be found in the following patent publications: Federal Republic of Germany 4 124 282 (Dorma GmbH); Federal Republic of Germany 3 934 662 (Gallenschütz Metallbau GmbH); Federal Republic of Germany 4 207 705 (Dorma GmbH); U.S. Pat. No. 4,581,849 (Schwarz); U.S. Pat. No. 4,154,023 (Carroll); and U.S. Pat. No. 4,952,080 (Boiucaner et al.).

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign and international patent publication applications, namely, Federal Republic of Germany Patent Application No. P 44 02 899.7, filed on Feb. 2, 1994, and International Application No. PCT/DE94/01459, filed on Dec. 8, 1994, having inventor Jürgen Stark, and DE-OS P 44 02 899.7 and DE-PS P 44 02 899.7 and International Application No. PCT/DE94/01459, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. Apparatus for driving a rotation of a revolving door about a central axis of a revolving door in response to an entry of a user thereinto, which revolving door includes the central axis, a plurality of door panels extending radially outward from the central axis, a drive motor for supplying a rotational torque to a revolving door, and a control circuit for controlling the rotational torque supplied to a revolving door by the drive motor, said apparatus comprising:

means for sensing a magnitude of at least one of:
 a user applied force applied by the user to at least one of said plurality of door panels; and
 a user imparted rotational velocity imparted by the user to said revolving door;
 to produce a sensed magnitude of said at least one of said user applied force and said user imparted rotational velocity; and means for operating said control circuit to cause said drive motor to supply a rotational torque to said revolving door that is substantially proportional to said sensed magnitude of said at least one of said user applied force and said user imparted velocity.

2. Apparatus for driving a rotation of a revolving door according to claim 1, said apparatus further comprising:

means for operating said control circuit to cause said drive motor to supply a rotational torque to said revolving door which substantially steadily increases over time.

3. Apparatus for driving a rotation of a revolving door according to claim 2, said apparatus further comprising:

means for operating said control circuit to limit the rotational torque supplied to said revolving door such that said revolving door does not exceed a specified parameter of movement.

4. Apparatus for driving a rotation of a revolving door according to claim 3, said apparatus further comprising:

means for making a determination of a substantial termination, from said sensed magnitude of said at least one of said user applied force and said user imparted rotational velocity, when said at least one of said user applied force and said user imparted rotational velocity has been substantially terminated; and means for, upon said determination of said substantial termination of said at least one of said user applied force and said user imparted rotational velocity, operating said control circuit to cause said drive motor to decrease over time the rotational torque supplied to said revolving door.

5. Apparatus for driving a rotation of a revolving door according to claim 4, said apparatus further comprising:

means for, during said operating of said control circuit to decrease over time the rotational torque supplied to said revolving door, continuing to sense the magnitude of said at least one of said user applied force and said user imparted rotational velocity, and, if said magnitude of said at least one of said user applied force and said user imparted rotational velocity increases, operating said control circuit to increase the rotational torque supplied to said revolving door.

6. Apparatus for driving a rotation of a revolving door according to claim 5, said apparatus further comprising:

means for, during said operation of said control circuit to cause said drive motor to decrease over time the rotational torque supplied to said revolving door, operating said control circuit to cause said drive motor to decrease the rotational torque supplied to said revolving door such that the rotational velocity of said revolving door decreases in a manner substantially corresponding to a natural coasting of a non-powered revolving door.

7. Apparatus for driving a rotation of a revolving door according to claim 6, said apparatus further comprising:

an initial activation switch; and means for operating said control circuit to cause said drive motor to supply said rotational torque to said revolving door only if said initial activation switch has been actuated.

8. Apparatus for driving a rotation of a revolving door according to claim 7, said apparatus further comprising:

means for controlling the rotational torque supplied to said revolving door by supplying said drive motor with pulse width modulated current.

9. Apparatus for driving a rotation of a revolving door according to claim 8, said apparatus further comprising:

means for measuring at least one parameter of operation of said revolving door; and means for storing said at least one measured parameter of operation of said revolving door in a non-volatile memory.

10. Apparatus for driving a rotation of a revolving door according to claim 9, said apparatus further comprising:

means for measuring said user imparted rotational velocity using at least one of: an incremental sensor and a tachometer generator.

11. Apparatus for driving a rotation of a revolving door according to claim 10, wherein:

said apparatus further comprises means for determining a kinetic energy contained in said revolving door to produce a determined kinetic energy contained in said revolving door, and means for operating said control circuit such that the rotational torque supplied to said revolving door corresponds to said determined kinetic energy contained in said revolving door;

said control circuit comprises an open loop/closed loop microprocessor control system;

said apparatus additionally comprises means for, during said operation of said control circuit to decrease over time the rotational torque supplied to said revolving door, continuing to sense for a presence of said at least one of said user applied force and said user imparted velocity, and operating said control circuit to cause said drive motor to supply a rotational torque to said revolving door which corresponds to any sensed magnitude of said at least one of said user applied force and said user imparted velocity; and said apparatus additionally comprises means for measuring a current consumption of said drive motor and for operating said control circuit to decrease over time the rotational torque supplied to said revolving door if said current consumption of said drive motor exceeds a specified limit.

12. Apparatus for driving a rotation of a revolving door about a central axis of the revolving door in response to an entry of a user thereinto, the revolving door including the central axis, a plurality of door panels extending radially outward from the central axis, a drive motor for supplying a rotational torque to the revolving door, and a control circuit for controlling the rotational torque supplied to the revolving door by the drive motor, said apparatus comprising:

means for sensing a magnitude of a user supplied parameter to produce a sensed magnitude of a user supplied parameter; and means for operating said control circuit to cause said drive motor to supply a rotational torque to said revolving door that is substantially proportional to said sensed magnitude of said user supplied parameter.

13. Apparatus for driving a rotation of a revolving door according to claim 12, said apparatus further comprising:

means for operating said control circuit to cause said drive motor to supply a rotational torque to said revolving door which substantially steadily increases over time.

14. Apparatus for driving a rotation of a revolving door according to claim 13, said apparatus further comprising:

means for operating said control circuit to limit the rotational torque supplied to said revolving door such that said revolving door does not exceed a specified parameter of movement.

15. Apparatus for driving a rotation of a revolving door according to claim 14, said apparatus further comprising:

means for determining from said sensed magnitude of said user supplied parameter when said user supplied parameter is substantially terminated to produce a determination of a substantial termination of said user supplied parameter; and means for, upon said determination of said substantial termination of said user supplied parameter, operating said control circuit to cause said drive motor to decrease over time the rotational torque supplied to said revolving door.

16. Apparatus for driving a rotation of a revolving door according to claim 15, said apparatus further comprising:

means for, during operation of said control circuit to decrease over time the rotational torque supplied to said revolving door, continuing to sense a magnitude of said user supplied parameter, and, if said magnitude of said user supplied parameter increases, for operating said control circuit to increase the rotational torque supplied to said revolving door.

17. Apparatus for driving a rotation of a revolving door according to claim 16, said apparatus further comprising:

means for, during operating said control circuit to cause said drive motor to decrease over time the rotational torque supplied to said revolving door, operating said control circuit to cause said drive motor to decrease the rotational torque supplied to said revolving door such that the rotational velocity of said revolving door decreases in a manner substantially corresponding to a natural coasting of a non-powered revolving door.

18. Apparatus for driving a rotation of a revolving door according to claim 17, said apparatus further comprising:

an initial activation switch; and means for operating said control circuit to cause said drive motor to supply said rotational torque to said revolving door only if said initial activation switch has been actuated.

19. Apparatus for driving a rotation of a revolving door according to claim 18, said apparatus further comprising:

means for controlling the rotational torque supplied to said revolving door by supplying said drive motor with pulse width modulated current.

20. Apparatus for driving a rotation of a revolving door according to claim 19, said apparatus further comprising:

means for measuring at least one parameter of operation of said revolving door; and means for storing said at least one measured parameter of operation of said revolving door in a non-volatile memory.

* * * * *

UNITED STATES PATENT AND TRADEMARK OFFICE
CERTIFICATE OF CORRECTION

PATENT NO. : 5,653,056
DATED : August 5, 1997
INVENTOR(S) : Jürgen STARK

It is certified that error appears in the above-identified patent and that said Letters Patent is hereby corrected as shown below:

In column 4, line 12, after 'FIG.', delete " 1' " and insert --1A--.

In column 4, line 13, after 'FIG.', delete " 2' " and insert --2--.

In addition, in column 4, line 14, after 'FIG.', delete " 3' " and insert --3--.

In column 4, line 15, after 'FIG.', delete " 4' " and insert --4--.

In column 4, line 17, after 'FIG.', delete " 5' " and insert --5--.

UNITED STATES PATENT AND TRADEMARK OFFICE
CERTIFICATE OF CORRECTION

PATENT NO. : 5,653,056
DATED : August 5, 1997
INVENTOR(S) : Jürgen STARK

It is certified that error appears in the above-identified patent and that said Letters Patent is hereby corrected as shown below:

In column 4, line 18, after 'FIG.', delete " 6' " and insert --6--.

In column 4, line 20, after 'FIG.', delete " 7' " and insert --7--.

In column 4, line 21, after 'FIG.', delete " 8' " and insert --8--.

In column 4, line 23, after 'FIG.', delete " 9' " and insert --9--.

In column 6, line 16, after 'FIG.', delete " 1' " and insert --1A--.

UNITED STATES PATENT AND TRADEMARK OFFICE
CERTIFICATE OF CORRECTION

PATENT NO. : 5,653,056
DATED : August 5, 1997
INVENTOR(S) : Jürgen STARK

It is certified that error appears in the above-identified patent and that said Letters Patent is hereby corrected as shown below:

In column 6, line 29, after 'FIGS.', delete " 2' and 3'. " and insert --2 and 3.--.

In column 6, line 35, after 'FIG.', delete " 7'). " and insert --7),--.

In column 6, line 50, after 'FIG.', delete " 2' " and insert --2--.

In column 6, line 51, after 'FIG.', delete " 3') " and insert --3)--.

In column 7, line 5, after 'FIG.', delete " 4', " and insert --4,--.

UNITED STATES PATENT AND TRADEMARK OFFICE
CERTIFICATE OF CORRECTION

PATENT NO. : 5,653,056
DATED : August 5, 1997
INVENTOR(S) : Jürgen STARK

It is certified that error appears in the above-identified patent and that said Letters Patent is hereby corrected as shown below:

In column 7, line 14, after 'FIG.', delete " 3' " and insert --3--.

In column 7, line 25, after 'FIG.', delete " 4'), " and insert --4),--.

In column 7, line 36, before 'This', delete " 5'. " and insert --5.--.

In column 8, line 8, after 'FIG.', delete " 2', " and insert --2,--.

In column 8, line 31, after the first occurrence of 'FIG.', delete " 5'. " and insert --5.--.

UNITED STATES PATENT AND TRADEMARK OFFICE
CERTIFICATE OF CORRECTION

PATENT NO. : 5,653,056
DATED : August 5, 1997
INVENTOR(S) : Jürgen STARK

It is certified that error appears in the above-identified patent and that said Letters Patent is hereby corrected as shown below:

In column 8, line 31, after the second occurrence of 'FIG.', delete " 5' " and insert --5--.

In column 8, line 50, after 'FIG.', delete " 6' " and insert --6,--.

In column 8, line 62, after 'FIG.', delete " 8' " and insert --8--.

In column 9, line 25, after 'FIG.', delete " 8' " and insert --8--.

In column 9, line 31, after 'FIG.', delete " 9' " and insert --9--.

Signed and Sealed this

Thirteenth Day of April, 1999

Q. TODD DICKINSON

Attest:

Attesting Officer

Acting Commissioner of Patents and Trademarks